United States Patent [19]
Copeland

[11] Patent Number: 5,015,918
[45] Date of Patent: May 14, 1991

[54] BICYCLE SINGLE-WIRE LIGHTING SYSTEM WITH STEADY-FLASHING-REFLECTOR REAR WARNING DEVICE

[76] Inventor: John Copeland, 1230 Alameda De Las Pulgas Apt. 3, Belmont, Calif. 94002

[21] Appl. No.: 402,123

[22] Filed: Aug. 31, 1989

Related U.S. Application Data

[63] Continuation of Ser. No. 223,297, Jul. 22, 1988, abandoned, which is a continuation of Ser. No. 825,380, Feb. 3, 1986, abandoned.

[51] Int. Cl.$^5$ .................. H01K 7/00; H05B 41/14
[52] U.S. Cl. ............................. 315/76; 315/179; 362/72; 362/227
[58] Field of Search .............. 315/75, 76, 77, 78, 315/179, 182, 190, 312; 362/72, 227, 228, 800

[56] References Cited

U.S. PATENT DOCUMENTS

| | | | |
|---|---|---|---|
| 3,779,629 | 12/1973 | Green | 350/103 |
| 4,323,879 | 4/1982 | Kelley | 340/134 |
| 4,388,559 | 6/1983 | Lefavour | 315/78 |

OTHER PUBLICATIONS

David Sellers, "Reflectors and Reflective Materials", Bike Tech, Jun. 1985, vol. 4, No. 3, pp. 7-13.
Stanley Electric Co., 2-9-13, Nakameguro, Meguro-Ku, Tokyo, Japan.
Wesley Iversen, "Would You Believe LED Brake Lights", Electronics, Sep. 18, 1986, p. 36.

Primary Examiner—Eugene R. LaRoche
Assistant Examiner—Ali Neyzari
Attorney, Agent, or Firm—Robert R. Keegan

[57] ABSTRACT

Red LEDs having sufficient brightness and efficiency are employed for a bicycle tail lamp. A xenon strobe provides extended visibility over the steady red LED beam, identifiable as a vehicle tail lamp; dispersed high intensity flashes of the strobe may be seen directly or observed as reflections from the surroundings. The flash is powered from the difference between the supply potential and that required by the LEDs so the current through the LEDs is controlled without wasting power or adding unproductive circuitry. These elements are located in a retro-reflector similar to that in common use on bicycles to form a warning device that is small, easy to mount, with an uncomplicated electrical hookup; a simplified parallel connection scheme needs only a single wire in addition to the metal bicycle frame. The system has the rechargeable battery and the generator substantially in parallel; generator power is used when the bicycle is in motion and battery power when stopped. The interconnecting wiring system assures the operation of the rear warning device from the generator should the headlamp be missing or disconnected with the rate of the omnidirectional flashes increased and is a partial substitute to the warning that the headlamp would normally provide.

22 Claims, 5 Drawing Sheets

BICYCLE SINGLE-WIRE LIGHTING SYSTEM WITH STEADY-FLASHING-REFLECTOR REAR WARNING DEVICE

This application is a continuation of application Ser. No. 07/223,297, filed July 22, 1988, now abandoned, which was a continuation of application Ser. No. 06/825,380, filed Feb. 3, 1986, now abandoned.

FIELD AND BACKGROUND OF THE INVENTION

The field of the invention is that of reflectors, warning lights and illumination lights together with their interconnection system as used by pedestrians and on bicycles or other small vehicles.

Present day vehicle tail lights utilize an incandescent filament bulb inside a mirrored cavity with a red lens covering the assembly. The mirrored surface is utilized to direct a substantial amount of light into a relatively narrow angle beam corresponding to the direction of the approach of following vehicles. Additionally, the lens gives the light its recognizable red color. Power for the lamp, in the case of a bicycle, is commonly from a 3 watt generator energized by way of the rotation of a wheel and is portioned 0.6 watts for the tail lamp and the remainder for the headlamp. However, this is in stark contrast to the automobile where just one side of its system would typically use ten times this amount of power.

Mechanically, the typical bicycle requires one-tenth of a horsepower from its rider for a speed of 12 mph and this is the equivalent of 75 electrical watts. Tests on the drag created by bicycle generators and published in the literature indicate that they require the equivalent of 15–33 watts additional effort, or 20–44% of the 12 mph effort—a considerable amount. In order to minimize size and weight, a properly designed generator would maximize the output power which implies that the electrical power lost internally and the power lost to mechanical drive coupling would equal the power delivered to the light system. Hence an improved generator which produced 30 watts of drag would have an output power of 10 watts. While this might be a significant improvement, this is still drastically less than the power typically involved in motorcycles and automobiles. Additionally the generator powered light system also has a serious drawback in that the lights are out when the bicycle is stopped and this can be a situation in which they are most needed for safety.

There has been some attempt to use rechargeable batteries to provide the power rather than relying on what can be conveniently generated by the rider, however in the prior art the result has been a system which is bulky and expensive, as well as inconvenient to mount and maintain. These are most generally useful to commuting cyclists whose schedule and need for lighting are non-varying rather than for the casual or juvenile cyclist. Systems which use dry batteries are relatively inexpensive and are convenient to mount and maintain by casual or juvenile cyclists; on the other hand, lights powered by dry batteries are usually of low power to obtain longer service life which makes them much less conspicuous and less safe.

Retro-reflectors, which operate to redirect the light from a source back to the source but do not have to be exactly aligned as would a mirror, require no power from the vehicle on which they are mounted for operation and by utilizing the higher intensity headlamps of an approaching vehicle can under usual conditions be seen at the necessary distances. Thus they are required by the governing authorities for night riding and also are generally accepted by the bicycling population. The ones commonly in use today are molded of a transparent plastic but have a translucent color of red for the rear, amber for the pedal positions and crystal meaning colorless for the front. They are smooth on the side facing in the direction of the light to be reflected which makes for easy cleaning, the other side having a pattern of multiple cube corners. This patterned side which causes the retro-reflection is protected from dirt and moisture condensation by a second molded piece which is glued to the first and forms an isolated air space.

The CPSC (Consumer Product Safety Commission) has set minimum standards for the reflectors that can and must be used on bicycles sold and used in the United States. This has resulted in the development of a very inexpensive unit which is rugged and not overly large owing to improvements in the manufacture of cube-corner retro-reflectors. The CPSC requirements ensure that the various approach angles of bicycle and automobile are taken care of through the specification of performance at large angles of retro-reflector horizontal orientation while mounting is held to a maximum of 5 degrees either up or down in the vertical. Because of the relatively large flat area of the face of the retro-reflector it is not unreasonable to expect the average cyclist will be able to maintain his retro-reflectors in a suitable orientation with only casual observation of their mounting position relative to the bicycle frame.

Helmut Zwahlen on the basis of studies performed at Ohio University has proposed that bicycle tail lamp requirements be adopted which dictate a two candle-power output for a red beam which spans 20 degrees in the vertical orientation and 40 degrees in the horizontal. He theorizes that such requirements could be met with a highly efficient sealed beam approach that would consume one watt of electrical power. He bases the two candlepower requirement on test results which indicate that a point light source tail lamp needs to be 1000 times brighter than minimum detectable brightness for laboratory type conditions of a uniform background with uniform illumination. The applicant has tested, to determine typical values, the rear tail lamp of three present day better quality bicycle generator sytems and found that they project rectangular shaped beams which have about 20 degrees of horizontal dispersion and 11, 13 and 20 degrees of vertical. Unlike the retro-reflector the orientation of the housing by casual inspection is much less satisfactory and the proper-method is to energize and project the tail lamp onto a wall so that the mounting can be adjusted to make the height of the projected beam the same as the mounting height of the lamp on the bicycle. A task which is complicated by the lack of generator output when the bicycle is stationary. Given the average cyclist's unwillingness to give much consideration to lighting systems which are typically used infrequently, it seems unlikely tail lamps with precisely focused beams represent an adequate solution.

If a motor vehicle is following another motor vehicle, the driver may or may not be aware of a vehicle ahead of the one he is following. However because he will soon pass a slower moving bicycle, he does need to be aware of a rider along the edge of the road whose retro-reflector and tail light may be obscured by the motor vehicles ahead of his own. Clearly if safety were the only requirement then the system which appears in U.S. Patents in abundance would also be commonplace on our streets. These systems place an omnidirectional light source above the rider at a height sufficient to be seen above adjacent automobile traffic, this usually being accomplished by a pole attached to the rear of the bicycle. One of these by Lewis (U.S. Pat. No. 4,088,882) offers substantially increased light output through the use of a flourescent bulb, even when compared to the new halogen type incandescent.

But power alone does not ensure conspicuity. Motorcycles, which have lights of comparable power to automobiles, have long been plagued by motorists making left turns into their path. A device which modulates the headlamp beam with a low frequency to make it more noticeable has recently been found to be effective in this situation. It seems that the dual lamp system and the presence of an unlighted but visible body provide important spatial recognition factors for the automobile and hence spatial factors must also be generated for bicycles if they are to have adequate conspicuity.

Flashing lights have been used on bicycles to increase their conspicuity while minimizing power consumption. However there have been problems in the prior art in that the cyclist naturally seeks to minimize his burden and has operated such devices in lieu of a red rear tail lamp. This has led to criticisms that the cyclist may be mistakenly identified, at least at first sighting, as a construction barricade and that the cyclist's position is difficult to keep track of during the interval between flashes. The flash rate is typically in the range of once a second and they utilize either an incandescent lamp or a gas filled flash tube.

When an incandescent lamp is used, it has a relatively higher power rating since it is operating with a low duty cycle. Additionally an inrush of current is necessary in order to heat the filament to incandescence. Thus it is usually necessary to power such a flasher from batteries, either dry or rechargeable, to provide the high peak power called for.

When a gas filled flashtube is used, the energy for the subsequent flash is first stored in a high voltage capacitor. Thus it is possible for this type of device to be powered from a generator where the peak power is limited. This approach is more complex however because it requires a voltage converter to transform the low input voltage by a factor of a 100 or more times to the potential needed by the flash tube. The least expensive and most common type of voltage converter uses a transformer with a high turns ratio. A pair of transistors in a self-driven arrangement connect the DC input voltage to the primary first with one winding polarity and then with the opposite winding polarity, while the alternating voltage on the secondary is rectified to charge the storage capacitor. Since the current is limited only by the resistances in the circuit this type of converter is not very efficient. And the current draw from the source is quite heavy for the time immediately following a flash when the voltage potential of the storage capacitor is lowest. When this circuit is used in battery powered strobes, the flash rate becomes much slower as the battery is progressively consumed since the voltage conversion ratio is fixed by the transformer turns ratio.

Although the flashtube may be designed to flash when the voltage impressed upon it reached a critical value, better efficiency and longer life result from the customary design of the flashtube which requires a separate trigger circuit to initiate the flash. Energy is first stored in a smaller trigger capacitor by way of a high resistance connected to the main storage capacitor. A trigger switch element then initiates the flash by discharging the trigger capacitor into the primary of a trigger coil, the secondary of which is connected appropriately to the flash tube. The trigger switch element may be a small gas filled discharge tube, however such tubes though small and easy to wire in are somewhat expensive and have a relatively high tolerance on their breakover voltage both initially and with consideration of wearout.

An inexpensive SCR (Silicon Controlled Rectifier) may be used as the trigger switch element however it requires additional circuitry to sense the high potential on the storage capacitor and provide current into its gate terminal. Because the flash tube sometimes doesn't fire when the trigger circuit is first activated, it is necessary to have the triggering repeat until the flash does occur. This is most easily accomplished by having the trigger circuit sense the voltage on the trigger capacitor rather than that on the larger storage capacitor from which it derives it's potential. This presents no problem with the previously considered gas filled trigger tube but adds complexity in the case of the SCR because of its anode leakage currents which act to set up an unwanted feedback loop through the voltage sensing circuitry that connects the SCR anode (the trigger capacitor potential) with the SCR gate. Another complication is that the breakover devices typically used in the voltage sensing circuitry require enough current from the high voltage supply as to create a significant drain of power.

Consider a comparison of two similarly priced battery powered flashers. A flashtube type of strobe unit marketed by Bike Nashbar which comes with a strap for arm mounting and the "Belt Beacon" an incandescent unit which is detailed in U.S. Pat. Nos. 4,047,150 and 4,323,879 by Kelley. The "Belt Beacon" uses a 9 volt transistor battery which is necessary in order to make use of a bulb with a low current rating which has less mass and will heat up quickly, while the strobe uses an C-cell flashlight battery which costs less and contains more energy. The housing of the "Belt Beacon" is sealed against dust and the printed circuit board has a wax dip to protect it from moisture. In the strobe, all of the electronics including the flashtube are cast in a hemisphere of clear resin to seal out moisture and make a rugged mechanical structure. Since the cast plastic hemisphere is no larger that the C-cell, the circuit used must be quite simple and compact. When the batteries are fresh the flash rate of the strobe is about once a second, this increases to seven second intervals when the batteries become exhausted.

While in the prior art it might have been regarded as a minimal burden by non-cycling persons, the need to provide for separate mounting and replacement batteries has been as significant as their price in detering their use as a standard conspicuity measure amoung the casual bicycling public.

The flyback mode of converter circuit which is theoretically efficient has been used in DC to DC conversion for products demanding higher quality. On a repetitive basis, energy from the source is first stored in an inductor and then relased at a higher potential to the storage capacitor. The self-oscillating type which is simplest, has been detailed in U.S. Pat. No. 4,388,559 by LeFavour for use on bicycles. The flyback converter does have a variable ratio step-up; however, the self-oscillating type draws increased current from the supply if its input voltage is increased and in the time immediately following a flash it will draw a decreased amount of current owing to a lengthening of the oscillation period. Driven types of flyback converters which could eliminate these drawbacks, have in the prior art been too expensive for a bicycle application suitable for a large number of the population.

Externally powered flashers have been offered as options in the deluxe systems intended for the commuting cyclist. However, flashers meant to operate on an arbitrary source potential of the customers choice have not been available. For reasons stated previously, the flasher operating characteristics are usually dependent on the powering source voltage and impedance which are in turn dependent on the particular battery type and/or generator employed. Additionally it is customary for these systems to employ polarized connectors in the interconnections to prevent the application of reverse potentials which could damage the electronic portion of either type of flasher. Since there is no standardization of connectors or electrical power sources, this limits the use of such devices in other systems, at least for the non-technically minded casual cyclist.

It has been reported that the Swedish company, Wilhelmina Plast, is making a bicycle mostly from plastic materials and is utilizing LEDs (Light Emitting semiconductor Diodes) for the tail light, powered by batteries located in the frame. LEDs bright enough for this purpose represent an advance in semiconductor technology and have been commercially available for a considerable number of years. Such devices have the necessary beam focusing inherent in their package design and emit monochromatic light, thus not needing filters which reduce efficiency, They are available in deep red which is advantageous since it is more recognizable to motorists than the filtered incondescent, which will necessarily appear more orange-ish. When operated within their ratings, the LEDs are very long lived and are not subject to breakage from shock as is the filament of low current bulbs.

However, there are no present commercial applications of such LED devices to bicycle tail lamps in the United States. This is because the only significant advantages of the LED lies in it's inherent deep-red color output and its longevity. These are not very significant compared to a cost of 5-10 times that of an incandescent and the mood of the bicycling community today which desires improved conspicuity for such a sizeable increase in cost.

The electrical design problems inherent in the utilization of LEDs are also numerous. A single large device is with present technology impractical and thus several smaller devices must be grouped together for high outputs. When current is applied each diode produces a nearly constant voltage drop depending mostly on the particular device construction and ranges from 1.7 to 2.5 volts. This necessitates the series connection of two or three devices to avoid wasting the power available from the source. Furthermore, if only a resistor is used to limit the current, then slight voltage changes due to battery use or fluctuations in the generator speed will cause large variations in current, which is highly undesireable. It also must be considered that the LEDs operate with current of one direction only, and this creates further problems if they are to be powered from the wheel driven generator which produces alternating current.

Even if these various known known lighting methods could provide adequate conspicuity, individuals who have attempted to simultaneously use the various known visual warning devices in order to overcome the inadequacies inherent in the use of any one alone, have been derisively called "Christmas tree advocates." However, Helmut Zwahlen has performed an experiment which shows that two reflectors spaced at a distance from each other are more conspicous than a single reflector of the combined area. In the case of the pedal reflectors which are currently part of the CPSC mandated system, there is little inconvenience involved. But in general, multiple deployment has been regarded as too much trouble by the casual and serious cyclist alike. While this opinion may not be well founded, it points to the failure of the prior art to provide a practical and convenient system that is effective in solving a complex conspicuity problem but involves only a few simple to use pieces suitable also for installation and maintenance by casual cyclists and juveniles.

Minimizing the number and mounting complexity of the required pieces of the system is important both to the serious cyclist, who is likely to completely remove the system during periods when it is not needed in an effort to reduce the weight of the bicycle and improve its appearance, and to the casual cyclist who needs to have reliability with as little amount of maintenance as possible. Plastic parts, particularly the headlight lens setup, deteriorate significantly with prolonged exposure to direct sunlight and the other elements. This dictates that some removal of components pieces should be anticipated even for the casual cyclist and is currently one of the limitations of the well known generator system in which the headlamp must be a securely grounded part of the system and is thus permanently fixed.

The minimum system presently kown to be necessary includes a head lamp for illuminating the roadway, a rear warning lamp, connecting wires and the red rear facing reflector which is required by the CPSC. It is desireable to include the option of a generator in this concept of a minimum system to provide for extended periods of operation and for partial operation when the batteries are absent or discharged. Although significant improvements in batteries may be on the horizon, the most likely result of such improvements would be to reduce the monetary cost or size of a system or to provide higher power lamps rather than providing for extended periods of operation to ensure reliability under all schedules of service.

Many otherwise suitable visual warning devices have not been given serious consideration due to their size and mounting. To the uninitiated the bicycle with its exposed tubular frame seems to offer a wealth of space and attachment points. However, only the space above the rear wheel and beneath the seat is of much practical use for rear facing devices. The sweep of the rider's legs and feet eliminate the use of the chain stays except near the rear axle; attachments to the rear axle make wheel changing difficult and many bicycles are fitted with quick release rear axle assemblies which are less adaptable than the threaded type; it is difficult to get a tight grip on the small and somewhat tapered tubes that form the rear wheel support triangle; and if the attachment slips it may interfere with the rotation of the wheel as well as scratch the paint on the frame. It must also be considered that bicycles are sometimes put on the ground on their sides which tends to damage any side attachments as well as to force them inward. If a bicycle to be used for touring is fitted with panniers and a sleeping bag on top of the rack, then even the underseat position is blocked, and only the rear of the rack remains as suitable. This leads to the observation that the CPSC mandated rear reflector is currently being placed at the only effective but out of the way position that is available, not necessarily the position which would make it most effective since car headlights are necessarily aimed downwards, and research has confirmed that this would favor a lower mounting position.

Operation of a rechargeable battery together with a wheel driven generator is offered in a system made by Velo-Lux. This is accomplished by rectifying the alternating output of the generator with bridge connected diodes which charge the battery, while the lights are being powered directly from the battery. The headlight, the batteries and the rectifiers are packaged together in a unit which can be removed from the bicycle and utilized separately as a portable hand held lamp. Since the headlamp unit has most of the bulk, most of the weight, and most of the monetary value of the system, it can be expected that it will probably not be carried on the bicycle itself except when in use. Considering that the cyclist is not always able to anticipate his night time riding situations correctly, there will be times when the cyclist would like to be able to use the generator which is permanently mounted to power the rear lamp which is also permanently mounted in order to be afforded some degree of protection. However, this is not possible because the connections between the tail lamp and the generator are made within the head lamp unit and because the batteries are necessary in maintaining the proper voltage for the operation of the lamps.

The popular bicycle generator consists of a permanent magnet revolving from a drive roller in contact with the tread area of a tire and operating in conjunction with a soft iron magnetic assembly to produce an alternating magnetic flux linked to a coil of wire. The flux induces an alternating voltage in the coil whose magnitude and frequency are proportional to bicycle speed. Because the coil has inductance and, the impedance of this inductance increases with frequency which is in turn related to bicycle speed, it is possible for the alternating current, which flows through both the inductive impedance and the resistive load of the lamp bulbs, to be relatively independent of bicycle speed within the range of normal operation of the bicycle.

The unloaded voltage produced by the generator, however, is typically much higher than the normal operating voltage so that if the head lamp should burn out or become disconnected, the voltage impressed on the tail lamp increases markedly and will usually cause the burnout of the tail lamp in a short time. Some newer generator systems which make use of halogen bulbs have a voltage limiting zener device to limit the maximum voltage to the lamp and improve on the constant voltage characteristics of the generator within the normal range of bicycle with and hence this voltage limiting will become functional on the peaks of the sinusoid. Because the waveform changes with increased limiting, the burnout or disconnection of the headlamp will still allow a much increased effective or rms voltage to be impressed on the tail lamp.

In the generator system the current is limited by the inductance of the generator winding and no lasting harm will be done if the wire connecting the lamps should short out to the bicycle frame. With battery power, however, there is a possibility of a large flow of current which could cause permanent damage probably in the nature of burning the insulation off of the connecting wires.

In considering the design of generator-battery system such as the Velo-Lux it is seen that if the batteries are used as a reservoir as it were to regulate the voltage to the lamps, then it is desirable to have a battery with a large electrical capacity. However for the casual cyclist size, weight and cost are important requirements and these are best met with a lower electrical capacity battery. Increasing the size basically helps in maintaining the lamp voltage within 4 percent of nominal over most of the discharge curve. But it doesn't help in controlling the extremes of the the voltage which are determined by the chemistry involved in the battery. Considering a nickel-cadmium unit, the voltage at end of discharge may be 20 percent less than nominal and under charging conditions it will rise about 10 percent.

One of the consumer's main objections to rechargeable battery systems is the high initial cost coupled with the uncertainty of the lifetime of the battery pack under practical conditions. Of particular concern is the need to avoid completely discharging the battery which will cause the nickel-cadmium battery pack to lose capacity and even more rapid loss of useful life in the case of the sealed lead acid gelled cell. These cells, particularly the nickel-cadmium can be protected by removing the load when the potential of the battery pack falls below an amount dependent upon the number of the cells. Although the headlight is dimmer when the battery pack is exhausted to this potential there is still a very much usable amount of light being produced and it is not usually possible for the bicyclist to judge this condition properly by himself and to shut off the lamp. A complicating factor is that the nickel-cadium battery, does have a need to be occasionally excercised to this complete withdrawal of charge condition and regimens which continually make use of only a portion of the battery capacity as is commonly done with the lead acid cell will not give good results.

The Velo-Lux unit uses a halogen bulb and has improved brightness and efficiency when compared to prior art headlamps. Incandescent bulbs of which the halogen is the best example operate most effectively with a closely controlled voltage which is as large as can be tolerated without incurring unreasonably short life. Regulator circuits clearly are needed here but have not been provided in the prior art owing to complexity and expense. The low cost integrated circuit regulator which is used extensively in industry has a minimum voltage drop which greatly exceeds the 0.15 volts drop that can be achieved from a circuit employing discrete parts. On the other hand the discrete circuit has required calibration and has needed many parts to enable it to work effectively under two differing design conditions, namely as a voltage limiter when the input exceeds the lamp requirements and as a minimum voltage loss straight through element when the input voltage equals or drops below the desired lamp voltage.

The wiring for the Velo-Lux as representative of the art, is simple and straight-forward but not very convenient for the bicyclist. Two cables each containing two conductors are used to connect the tail lamp and the generator to the headlamp unit. As well as the previous problem of no direct generator operation of the tail lamp there are the additional problems of some confusion in having to connect two similarly shaped connectors to the head lamp unit and the fact that the two cables which must be routed along the tubing are not easily removeable even though the head lamp unit is itself easily removeable. Such permanent wiring is usually objectionable to the casual as well as the serious cyclist because it is obtrusive, unsightly, difficult to install and easily damaged.

On the other hand, the wiring for the well known generator system can be accomplished rather neatly since only a single small diameter wire is used in addition to the metal bicycle frame. This allows access to the interior of the frame tubing by way of drilling of holes of sufficiently small diameter so as to not affect frame strength and is available as a standard feature on some better quality bicycles. The special connectors on the ends of the cables and the larger number of holes preclude the internal to the frame routing of the cables for the Velo-Lux or other prior art systems which require multiple cable wiring.

BRIEF SUMMARY OF THE INVENTION

It is an object of the invention to combine within a single rear warning device the steady directional monochromatic light source, which is the "recognizable red" beam of a standard rear vehicle tail lamp, with a pulsed gas discharge light source which produces a bright dispersed colorless flash (white light). This flash can be made to briefly illuminate part of the bicycle and its rider and to provide reflections from the roadway, other vehicles and nearby objects. The result being a spatial factor that can alert drivers of approaching vehicles sooner than would be possible with a reflector or red tail light alone. Conveniently in the preferred embodiment these steady and flashing sources are high efficiency red LEDs and a xenon strobe. Although the LED lacks the generally high level of brightness needed to guarantee visibility from substantial angles and distances, its barely adequate level of performance is offset in the invention by the high momentary brightness of the strobe. The rear warning device thus can be highly effective with a power requirement that does not exceed those of rear lamps presently in common use on bicycles. It is an object of the invention to provide an effective night safety device for the rear of a bicycle which requires only the minimum necessary accommodation. This minimum is currently defined in size and mounting by the CPSC mandated rear retro-reflector. Thus the invention builds the omnidirectional pulsed gas discharge light source and the steady monochromatic beamed light source within the retro-reflector shell. The previously wasted airspace now being utilized, in that the retro-reflector is discovered to provide the proper housing and protection for an electronic printed circuit assembly. The quality of the retro-reflector is not significantly compromised in this combination noting that only a small portion of the available surface need be a window for the beam of monochromatic light. Also noting that the pattern of the cube corners in the retro-reflector does not significantly affect the random dispersion of light from a gas filled flash tube located behind it because the length of the arc in the flash tube subtends a number of the cube corners of the retro-reflector. In the preferred embodiment, the plastic backing piece which is usually molded of an opaque material and the front retro-reflector portion are now made of clear material to allow an omnidirectional flash. If it is necessary to color the reflector, drastic attenuation of the flash may be avoided in an alternative housing design which has a third clear molded portion to separately enclose the gas discharge tube.

It is an object of the invention that in placing the rear warning device with its beamed light source into a housing design like that of a retro-reflector presently manufactured to CPSC requirements that the general flatness and presence of vertical lines on the unit provide a means whereby the cyclist can by casual observation its of it's mounting position adjust the beam to the proper orientation with respect to the bicycle and hence to the traffic environment. In the construction of the prefered embodiment, the LED package type can be chosen to provide for the desired degree of vertical dispersion and more than one LED can be used so that the leads of individual LEDs may be bent to provide the desired amount of horizontal beam angle, the circuit board to which the LEDs are attached conforming to the general plane of the retroreflector housing.

It is an object of the invention to provide an efficient circuit for a rear warning device which can operate effectively with widely varying source voltage, and whose current consumption is steady and does not change when the source voltage varies. An inexpensive implementation of the efficient and more manageable flyback converter of the driven type is disclosed to implement the charging circuit for the pulsed gas discharge light source. A separate oscillator circuit which drives the converter makes the period of time that the inductor draws energy from the input, an inverse relation of the input potential and it makes the time period that the inductor transfers energy to the storage capacitor, unvarying. These new design factors make the input current draw substantially independent of either the varying input or storage capacitor potentials. Thus the warning device is useable from most any source of electrical potential without much regard for the source impedance, and the device can tolerate pulsating or unsteady voltages inherent in obtaining direct current from the alternating output of a wheel driven generator. Of additional importance, this circuit makes the warning device tolerant of supply potentials that would be excessive and cause burnout in prior art rear lamps.

It is an object of the invention to eliminate the circuitry and its attendant power loss that would otherwise be necessary for controlling the current through the LED used as a beamed source of monochromatic light in a rear red vehicle tail lamp. In the invention, the input terminals of the voltage step-up charging circuit which powers the flash tube are connected in series with the LED, which may be a series and parallel combination of LEDs, so that the current through the LED and the entire unit is limited by the charging circuit. Because of the series connection, if the current is maintained constant with regard to changes in the source voltage, the LED brightness will not change, but the power to the flash tube will increase as more voltage is applied, creating in the design disclosed an increase in the flash rate rather than a change in the intensity of the flash itself.

It is an object of the invention to provide a circuit for a rear warning device which makes use of the diode blocking action of the LED to prevent damage in the situation of the warning device being incorrectly connected to the supply in opposite fashion by the cyclist.

It is an object of the invention to disclose a warning device that has all active electrical parts on a single circuit board without parts mounted to the case, subassemblies or loose wiring. Not only does this make the device easier to manufacture, but it also makes it easy for the user to replace the plastic case himself should this become necessary because of scratches or cracking from rough handling that is to be expected in the rather exposed position on a bicycle where it must be mounted.

It is an object of the invention to disclose a simple, low cost trigger circuit for gas filled flashtubes by employing an integrated circuit differential comparator. The invention uses the output of the comparator to effectively short the gate junction of an SCR to reduce its anode leakage currents. A capacitor is also added between the output of the comparator and its non-inverting input which is in turn connected to the tap of a resistive divider that monitors the potential on the trigger capacitor which is supplied from the potential on the high voltage storage capacitor. This added capacitor introduces positive feedback in a precise and controlled manner to effectively eliminate the troublesome condition of the prior art when the storage capacitor potential neared the point of triggering and the leakage of current through the SCR anode created unwanted feedback and hence unreliable operation. Moreover this added capacitor shunts noise signals to ground and thereby enables the use of very large value resistances in the divider for minimum power loss.

It is an object of the invention to provide a method of attachment for the rear warning device which can be accomplished quickly and easily. This additionally will allow the bicyclist to remove the unit and carry it with him which may be necessary for instance to prevent theft. The mechanical and electrical connections are combined in the novel method disclosed which is made to permit the use of the mounting presently in use by several reflector manufacturers so that the invention may at the discretion of the cyclist be fitted to existing support brackets.

It is an object of the invention to provide a rechargeable headlamp unit employing only a single connector to provide both for recharging and/or the simultaneous operation of the rear warning device, thereby making its use simple and unconfusing. This is accomplished in the invention by placing the rechargeable batteries and the generator substantially in parallel.

It is an object of the invention to disclose a bicycle lighting system including headlamp, rear warning device, rechargeable batteries and generator which allows a simple two conductor parallel connection system and which permits partial operation when some of the pieces are not installed or absent. In the prefered embodiment, a generator with rectified output allows a single wire connection system using the frame as ground and is suitable for hidden wiring in better quality bicycles, as was the simple generator wiring of the prior art. An alternative arrangement, which could use the customary frame connecting alternating current generator, connects the headlamp, with a removeable two conductor cable, to a rectifier unit permanently mounted in the out of the way position, such as behind the rear warning device or near the generator that in present manufacture is mounted just back of the bottom bracket which is the portion of the frame holding the bearings for the pedal cranks axle. Conveniently, the removeable cable features the same type of connector on both ends and is reversible. Moreover, this same cable may also be employed to connect a wall transformer unit to recharge the headlamp batteries, thereby eliminating the breakage due to repeated flexing and yanking of the wire that has previously been made a part of a wall transformer supply unit. This being of particular benefit to touring cyclists who will likely be storing the system in their panniers during the daytime.

It is an object of the invention to prevent damage in the case of loose connections as well as to provide for partial operation. In the invention, the alternating output of the generator is rectified with diodes and provided with a voltage limiting device such as a zener diode. The zener need have no effect when the generator output is properly loaded by the headlamp unit, but if the headlamp unit is disconnected, it will limit the inductive spike produced in the generator winding and provide a restrained voltage for the rear warning device of the invention. Hence the system will accept either the incandescent head lamp of the well known generator system or preferably an improved unit containing rechargeable batteries which will provide steady headlamp illumination and power to the rear warning device of the invention, under all conditions of vehicle speed.

It is an object of the invention to disclose a sustantially parallel connected battery and generator system that is not damaged by shorts in the interconnection wiring. A simple electronic fuse circuit utilizing a MOSFET, a transistor, two resistors and a ceramic delaying capacitor is disclosed. This fuse which protects against the damaging flow of battery current in the case of shorted wiring, resets immediately if a generator is providing simultaneous power and upon temporary removal of the load with battery only operation.

It is an object of the invention to use relatively low capacity cells in the optional rechargeable headlamp, which can also be used as a portable lamp, making it smaller, lighter and less expensive. Because the rear warning device of the invention does not require a closely regulated supply potential it is possible to provide regulation for a halogen head lamp bulb within the confines of the headlamp unit only and that such inclusion permits the reduction in the size and electrical capacity of the rechargeable batteries incorporated in the headlamp while enjoying the increased light output available from an incandescent that is always operating at peak efficiency and is not subjected to life-shortening short-term overvoltages. When nickel-cadmium rechargeable batteries are used in the embodiment, the voltage regulating circuitry for the headlamp may have an additional use in automatically shutting off the head lamp when the energy in the batteries has been depleted to a point where further withdrawal might cause damage through potential reversal of one of the individual cells.

The voltage regulator disclosed in the invention has a very minimum voltage and power loss while being composed of only a few inexpensive parts which nonetheless provide without adjustment the initial and long term accuracy of 5% which is required for the proper operation of a halogen bulb. This accuracy and control is provided by an integrated circuit shunt voltage regulator acting in conjunction with a two transistor plus LED power amplifier. The LED which is used in this instance for its electrical similarity with a low voltage zener element makes possible much improved transition characteristics between saturation (fully conducting with low voltage drop) and limiting (linear) operation.

Sony Energytec has very recently announced the development of a new rechargeable lithium-manganese cell which they report to deliver 2.4 times the energy with a weight that is 65% that of an equivalent sized nickel-cadmium cell. It uses an organic-solvent electrolyte instead of an aqueous solution so that when fully charged there is no further current flow and the battery potential may increase. With the inclusion of the simple low loss voltage regualtor that is disclosed for regulating the potential to the halogen headlamp bulb, such a cell would likely be of great benefit in the practice of the invention if it proves to be a commercially viable product.

It is an object of the invention that overcharging of the batteries can be prevented by a means which causes less current to flow to the headlamp/batteries unit while still allowing for the proper operation of the rear warning lights. In the case of recharging from the generator, the maximum voltage in the system is limited by a zener or a similar element. With the corresponding home wall recharger, all that is necessary is to provide adequate current with an uncritical voltage set by the turns ratio of transformer. In particular if nickel-cadmium cells are used, circuitry may be provided to monitor the current which charges the battery, and a resistive impedance imposed in the charging loop to regulate the flow of this current at times that it would be excessive. However, the self-limiting characteristic of Sony's new lithium-magnesium batteries holds the promise of not needing any such additional circuitry.

It is an object of the invention that when the generator is used to power the rear warning device in a partial operation of the system without the headlamp or batteries being present, that the flash rate of the rear warning device will be at a maximum, and that the omnidirectional warning flashes thus produced will become a partial substitute for the warning that the headlamp would normally provide.

DETAILED OPERATION OF THE SYSTEM

Figure 1:
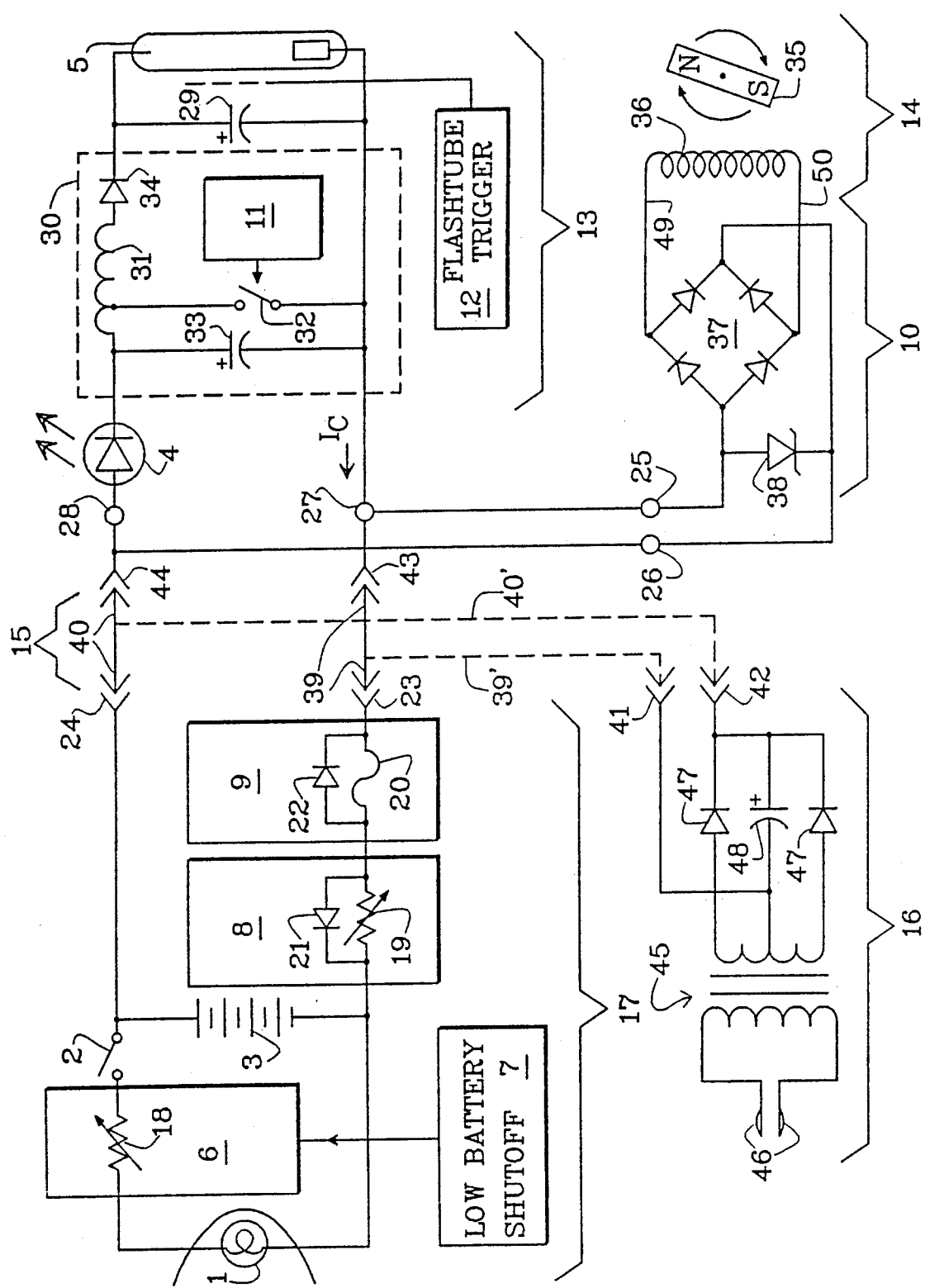
FIG. 1 is a simplified electrical schematic diagram of the bicycle lighting system of the invention. In this figure the numbers 6-9, 11-12 given to the sub-circuit blocks refer as well to similarly numbered following figures.

In the removable headlamp unit 17 incorporating rechargeable batteries of FIG. 1 the headlamp bulb 1 is energized from the battery 3 through the regulating circuit 6 when the user turns on the switch 2. The lamp voltage regulator 6 imposes a voltage drop represented by the variable resistance 18 to maintain the lamp 1 voltage $V_L$ constant at times when the battery potential $V_B$ exceeds the lamp requirements. An optional low battery auto shutoff circuit 7 can be added to the lamp voltage regulator circuit 6. This circuit which is especially desireable to use with nickel-cadmium batteries removes the load when the battery voltage drops below a critical level and is almost equivalent in its performance to the opening of switch 2. The connections 23-24 of the removable headlamp unit 17 provide a path for placing the battery substantially in parallel with the generator so that the battery 3 can supply power to the rear warning lights 13 and power from the generator 14 can reach the battery 3 in order to minimize its discharge or if enough power is being generated, provide for recharging. An electronic fuse circuit shown in block 9 is imposed in this path to prevent the damaging flow of battery current should the external connections place a short circuit between the terminals 23-24. In the simplified form shown this is represented by a current limiting element 20 and an ideal diode 22 which bypasses it for currents of the opposite direction which source from the generator.

Figure 8:
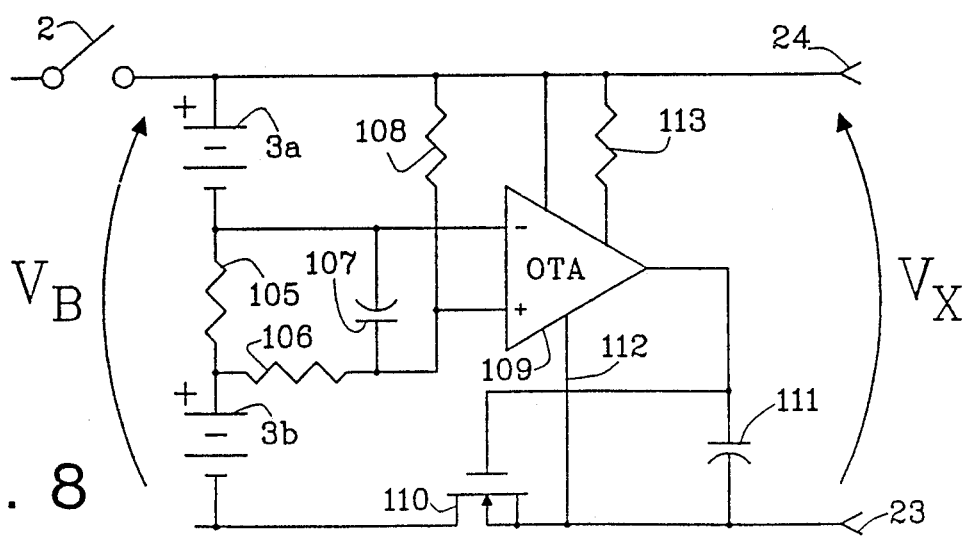
FIG. 8 is the detailed schematic diagram of a current limiting circuit which may be used in conjunction with sealed nickel-cadmium batteries to facilitate their safe recharging.

In block 8, battery overcharging is prevented by decreasing the current flow from the external source in the path provided by connections 23-24 by a varying resistance element 19 which is bypassed by the ideal diode 21 for battery current which flows to the rear warning lights 13. If rechargeable lithium-manganese batteries are used, it is apparent that the battery overcharge limiting block 8 would not need to be an actual circuit because of charge limiting characteristics inherent in the chemical action involved. With other types of batteries the circuit might be of a form which integrates the current into and out of the batteries 3 or measures some other parameter in order to halt the flow through element 19 altogether when it has been determined that sufficient recharging has taken place. Or it may take a form which is particularly suitable for use with sealed nickel-cadmium batteries that is shown in FIG. 8 to be detailed later which measures the current flowing into the battery 3 and acts to limit it to a continuously safe maximum value by means of the variable element 19.

When in operation on the bicycle, the external connections to the headlamp unit 17, the rear warning lights 13 and the rectified generator output 12 have common electrical conductor paths which places them in parallel connection one with another. Thus the bicycle frame could be utilized for one of these paths, for instance, by grounding to the frame the positive terminals 26, 28 and either terminal 44 or a contact which would mate directly with terminal 24 thus eliminating the need for any actual wire between these points. When necessary the batteries 3 can be recharged from the bicycle generator with the headlamp switch 2 in the off position or more conveniently by removing, and then connecting the headlamp unit 17 to the output of a wall recharger unit 16. These arrangements are shown in FIG. 1 by the cable 15 which through conductors 39-40 connects headlamp terminations 23-24 to bicycle mounted terminations 43-44 or with the cable 15 in an alternate position shown in dashed lines the headlamp terminations 23-24 are connected through conductors 39'-40' to the wall recharger terminals 41-42.

The bicycle generator 14 typically has a small drum in contact with the tread of one of the tires in order to rotate the magnet 35 at a high rate. This induces a voltage in the magnetically linked coil 36 which is connected to the input of a bridge rectifier 37, the output of which feeds the terminals 25-26. A voltage limiting device, represented as zener 38, is also connected to the rectified output 25-26 of the generator. The limiting voltage value of element 38 is chosen to be above the maximum voltage into the rechargeable batteries unit 17 including expected losses in the wiring except when the battery charge limiting block 8 is active. Hence all the power output of the generator will go towards lighting the lamp 1, lighting the rear warning lights 13 and recharging the batteries 3 until excess current is available from the generator at which time it will be shunted through the element 38 because of the action of the battery overcharge limiting 8 that is employed. The voltage limiting element 38 is also sized to accept the full power output of the generator 14 in the case of the headlamp unit 17 being disconnected. This in addition to the electronic fuse 9, assures that the system is protected against damage due to breaks or shorts in the common path wiring on the bicycle itself which places the various units in parallel combination which in FIG. 1 is seen to be the connections between terminals 24, 26 and 28; and the connections between terminals 23, 25 and 27 where one of these two as noted previously could be the bicycle frame itself. It is further noted here that the internal inductance of the coil 36 protects the generator 14 in case of shorts as it did in the generator only system of the prior art.

The rear warning lights which are powered through combined mounting and electrical terminals 27-28 comprise a gas filled discharge tube 5 in conjunction with a high voltage storage capacitor 29 to produce dispersed flashes of light and an LED 4 which may actually be a series parallel combination of a plurality of LEDs 4a, 4b to produce a beam of monochromatic light which is typically a long wavelength red that is highly recognizable as a rear vehicle lamp. The pulsed gas discharge light source formed of high voltage capacitor 29 and flash tube 5 is energized by a charging circuit 30 whose input is connected to the supply potential on terminals 27-28 through the LED 4. The charging circuit 30 shown is a voltage conversion flyback type consisting of an input filter capacitor 33, a storage inductor 31 with a voltage step-up winding, a switch 32 for allowing the periodic build-up of current in the inductor 31, an oscillator shown in block 10 for periodically opening and closing the switch 32, and a rectifier 34 for releasing the energy stored in the inductor 31 to the storage capacitor 29. Additionally in the rear warning lights 13, a trigger circuit shown in block 11 is needed to initiate the pulse discharge into the tube 5 in response to the potential on capacitor 29, which is being incrementally increased by the charging circuit 30, having attained to a sufficient amount.

The high frequency rectangular wave oscillator 10 includes means of adjusting the time proportions of its waveshape so that the ON time and duty cycle of switch 30 are changed in response to the supply potential at terminals 27-28 with the effect that the current $I_C$ into the rear warning light circuit is maintained substantially constant. The current $I_C$ also flows through the LED 4 so that the effect of the oscillator adjusting means is to make the current energizing the LED substantially constant which allows for proper operation of the rear warning lights in spite of a changing supply voltage $V_S$ on terminals 27-28 caused by rectified pulsations and varying amplitude due to varying bicycle speed from generator 14 as well as the charge/discharge cycle of the batteries 3.

Consider the following example based on the use of a 5 cell nickel-cadmium battery pack and a 6 volt 3 watt nominal rating bicycle generator. Headlamp bulb 1 is chosen to be 6 volts at 2.4 watts which is a standard item and the lamp voltage regulating circuit 6 has a minimum voltage loss of 0.15 volts making the minimum battery voltage $V_B$ just before loss of regulation equal to 6.15 volts. This is quite satisfactory since the midpoint discharge potential of the nickel-cadmium batteries will typically be 6.25 volts. A standard value 8.7 volts 5 watts rated zener is chosen for the limiting element 38 which places it above the crest value equal to 8.48 volts of a 6 volt sinusoidal wave. If the switch 2 is off for charging, the battery voltage $V_B$ could increase to as much as 7.5 volts and consequently a loss of 1.7 volts in wiring and normal passage through the protective blocks 8 and 9 is allowed before voltage limiting element 38 will conduct, a condition that is easily met by the circuits disclosed in FIGS. 8, 9 to be detailed later. The rear warning lamps are designed so that the current $I_c$ is similar to prior art generator tail lamps or 0.1 ampere for the range of voltages encountered in operation. The minimum operating voltage is encountered in battery only operation when for conditions approaching exhaustion about 1 volt per cell or 5 volts total is available while the maximum voltage encountered is the peak limited by the element 38 which allowing for practical devices and tolerances might be about 9.5 volts.

Figure 10:
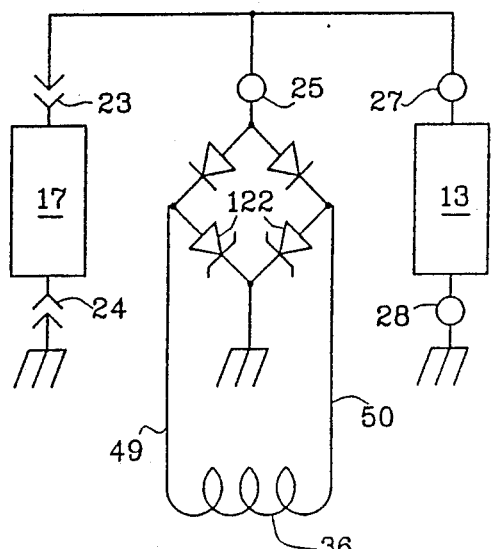
FIG. 10 is a portion of the detailed schematic of the rear warning device which is shown complete in FIG. 13 which reveals the freerunning oscillator of the invention which is used to drive the MOSFET switch in the charging circuit 30.

Continuing with the example, the generator 14 has an output frequency proportional to bicycle speed, ranging in the construction of those presently manufactured from 100 to 230 Hz for a bicycle speed of 12 mph. The converter in the charging circuit of the rear warning lights 14 is made to operate at a much higher frequency in order to reduce the size of the required inductor 31 and the input filtering capacitor 33 which is effective at the charging circuit 30 converter frequency 10 but not at the generator 14 frequency. This choice of a higher converter frequency also minimizes the stress on the LED 4 which typically have a thermal time constant which is on the order of the period of the generator 14 frequency. With the oscillator of FIG. 10, to be explained in detail later, the frequency decreases and the duty cycle increases in response to a decrease in the supply voltage $V_s$ at terminals 27-28, thus maintaining the converter current $I_c$ averaged by filter capacitor 33 which also lights the LED 4 substantially constant. At the nominal $V_s$ equal to 6.25 volts the current draw $I_c$ is 100 milliamperes with an operating frequency of 25 KHz and a duty cycle of 61%; with $V_s$ lowered to 5 volts the current draw $I_c$ is 103 milliamperes, the frequency lowers to 18 KHz and the duty cycle increases to 73%; and with $V_s$ raised to 9.5 volts the current draw $I_c$ is 82 milliamperes, the frequency increases to 36 KHz and the duty cycle decreases to 46%.

The AC mains recharger 16 contains a step-down transformer 45 encased in a plastic insulating structure of essentially cubic shape. Short prongs 46 connected to the transformer primary protrude from the case for insertion in a standard wall outlet while the lower voltage secondary is rectified by diodes 47, filtered by capacitor 48 and made available for interconnection with the headlamp unit 17 by the terminals 41-42. Although most such wall transformer units in use today have permanently attached cables for their interconnections in place of the terminals 41-42 that are shown, it would be a real advantage to the cyclist to be able to separate the cable thereby avoiding fatigue breakage problems of the cable and to facilitate the packing of the transformer unit into panniers on the bicycle.

Moreover in a version of the system which does not rely upon the bicycle frame for a common interconnection, the same cable 15 can be used in a dual role either for recharging away from the bicycle or to span the front to back distance of the bicycle in connecting the headlamp unit 17 to the terminal connectors 43-44 which would for this version of the system be contained with the rectifiers and voltage limiter 10 as a part of generator 14 or if a prior art generator were to be used, in separate enclosure near the generator. Furthermore an additional set of terminals connected in parallel and of similar construction to the terminals 43, 44 would be provided in place of the terminals 25, 26 so that a cable with one end similar to the ends of cable 15 and with ring lugs 77 could be connected to the rear warning device terminals 27, 28. These arrangements are more suitable to the casual cyclist since the system is connected with cables having either plug-in connectors or the easily removed thumbscrews 74. And if all the connectors are similar, the cable from the rear warning device can connect directly to headlamp 17 or to the generator-rectifier unit as an intermediary depending upon the bicylist's requirements.

DETAILED DESCRIPTION OF THE REAR WARNING DEVICE

Figure 2:
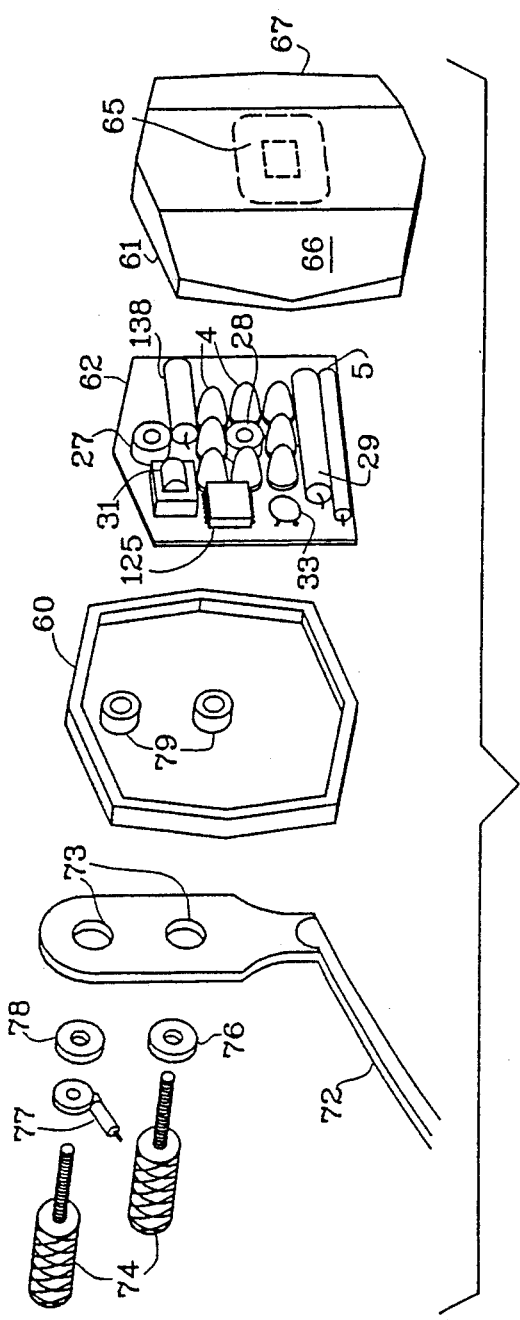
FIG. 2 is an exploded perspective view of the side of the rear warning device along with its combined mounting and electrical connection means. Also shown are a portion of a typical bicycle reflector mounting bracket and part of a connecting wire.

Referring to FIG. 2, the preferred embodiment is assembled from two transparent plastic molded pieces 60 and 61 which are glued together at their edges 63 to enclose a printed circuit board 62 and components. The retroreflector which faces in the same general direction as the LEDs 4 is formed by a molded pattern 64 of cube corners on the inside surface of plastic piece 61 which can be partially seen in FIG. 5. The LEDs 4 shine through a window area 65 which is a separate portion devoid of retroreflective cube-corners of the central face area of the plastic case piece 61. This piece is further seen to have two side surfaces 66, 67 which are at an inclination of approximately 30° with the central section. This construction is presently employed to meet current CPSC regulations which have been adopted to ensure adequate performance when there is considerable angular displacement between the direction of the bicycle and the direction of an approaching vehicle. Although the CPSC performance specifications only require a minimum amount of returned light, some researchers think that a minimum area also should be specified. At the present time the central section of the typical bicycle reflector has an effective area of about two square inches and each of the side sections have about one square inch.

Figure 5:
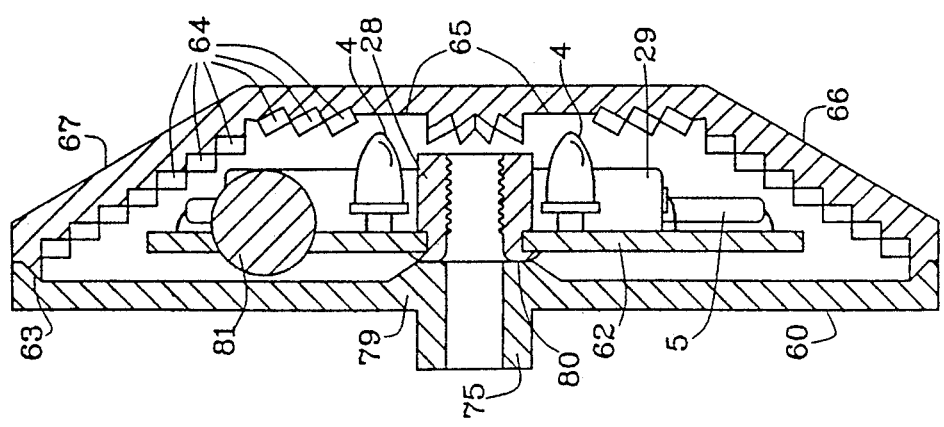
FIG. 5 is a cut-away view of the rear warning device showing the LEDs, the window through the retro-reflector for the LEDs, a cross section of the circuit board and the portion of its combined mounting/electrical connection arrangement which is within the device.

Although one of the side sections 66, 67 obviously must disappear for horizontal viewing angles exceeding 30° nonetheless, the orientation angles chosen for the cube corners 64 on the inside surfaces of 61 are different for the two halves of the "split field" central section and the two side surfaces which are seen in the cross-section of FIG. 5. Typically the side sections which are retro-reflective for at least an additional 10° to either side are effective in outlining the entire face of 61 to the driver of an approaching vehicle.

The gas filled flash tube 5 is disposed horizontally below the high voltage storage capacitor 29 near the bottom edge of the plastic case formed by reflector 61 and rear piece 60. The usual plastic sleeve which insulates and carries the markings for capacitor 29 is removed to allow its shiny aluminum case to act as a reflector for the upwards directed portion of the flashes that are emitted from the flash tube 5. The high intensity flashes of white (colorless) light must pass through at least one of the enclosure pieces 61, 60 to be visible. These plastic pieces could be tinted red or amber, such as the lens of an automobile tail light. However, doing so will dramatically lower the visibility because by filtering two of the primary colors (green and blue), only a third portion of the emitted spectrum would remain, and the sensitivity of the human eye is less for red and amber than it is for green. An additional problem is that the high intensity of the light may saturate the tinting substance, and, consequently, the flash will have only a partially colored appearance. The best choice then is a clear material for the pieces 60, 61.

Figure 3:
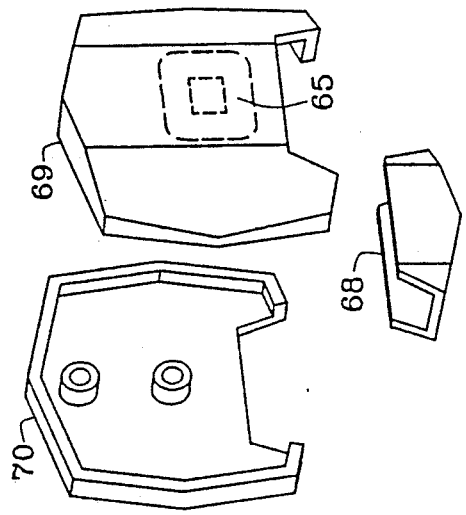
FIG. 3 is an exploded side perspective view of an alternate three-piece case design for use in place of the two-piece case design of FIG. 1 when it is necessary for the retro-reflector to have a color.
Figure 4:
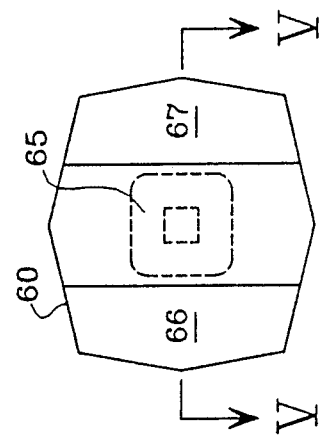
FIG. 4 is a front elevational view of the rear warning device of FIG. 1 as it would appear when viewed from a position behind the bicycle upon which it is mounted, showing the portion cut away for FIG. 4.

If it is necessary to have a tinted reflector because of legal restrictions for instance that require the reflector surface to have a red appearance, then an alternate three-piece case construction shown in FIG. 3 could be used. In this instance the separate case piece 68 which encloses the flashtube 5 could be molded of clear plastic while the retro-reflector piece 69 could be tinted red and the backing piece 70 could be opaque as is customary for reflectors of present manufacture.

It is expected that the unit will be mounted on the bicycle in the places where the red rear reflectors are presently being utilized. On a bicycle with a rear utility rack, this would be on a protrusion at the rear extremity of the rack. For bicycles not so equipped, the reflector is usually under the seat fixed to a bracket 72 which has been attached to the bicycle seat stay crosspiece (not shown) along with the rear caliper brake. The bracket 72, usually formed from thick sheet steel, typically has two $\frac{1}{4}''$ holes 73 spaced on $\frac{3}{4}''$ centers as illustrated FIG. 2. The typical reflector that mates with it has a $\frac{1}{4}'' \times 20$ threaded steel stud projecting through the rear at the center with a short $\frac{1}{4}$ round molded boss located for the second hole. Usually the top and bottom of the reflector are interchangeable and thus the stud can be placed in either hole. The comparatively large diameter stud provides for sufficient tightening to prevent loosening from vibration while the molded boss prevents rotation.

The preferred embodiment of the rear warning device 17 is held securely in place on the mounting bracket 72 by two thumbscrews 74 which mate with the internally threaded brass standoff spacers 27, 28 which are staked onto the top side of printed circuit board 62 and soldered to the foil traces on the opposite side. The thumbscrews 74 are insulated from the bracket 72 where they pass through the holes 73 by hollow insulating bosses 75 molded onto the exposed side of the rear plastic enclosure piece 60 as seen in FIG. 5. If electrical contact with the mounting bracket 72 is desired then a metal pressure washer 76 is used under the head of the thumbscrew 74. Otherwise, a spade lug 77 attached to a wire lead and an insulating fiber pressure washer 78 are used under the thumbscrew 72 as seen on the upper thumbscrew of FIG. 1. Hollow supporting bosses 77 concentric with the outside bosses 75 are molded to the inside surface of rear enclosure piece 60 and make physical contact 80 with the smooth swaged end of threaded spacers 27, 28. When the thumbscrews 74 are tightened, pressure on the engaged threads and against the smooth ends of the spacers 80 acts to exclude dirt and water from the interior of the warning device 17.

The circuit board 62 has three cut-out areas as is shown in FIGS. 1, 5. One area is for the high voltage storage capacitor 29 and agas filled flash tube 5. Another is for the high frequency converter transformer 31 which allows its ferrite core to be glued to the top surface of the board, and the third is for the trigger coil 81. These components are the largest and have been located behind the central section of the reflector 1 so as to minimize the thickness of the assembled unit thereby retaining the strength and durability that is characteristic of the modern design bicycle retroreflector. The leads from all the components (with the exception of the transformer 31 and the trigger wire from coil 81 which may be connected directly to flashtube (5) extend through holes from the plain front surface of board 62 to the rear foil side where they are soldered as is the customary practice for single-sided circuit board construction.

DETAILED ELECTRICAL OPERATION OF THE HEADLAMP UNIT

Figure 6:
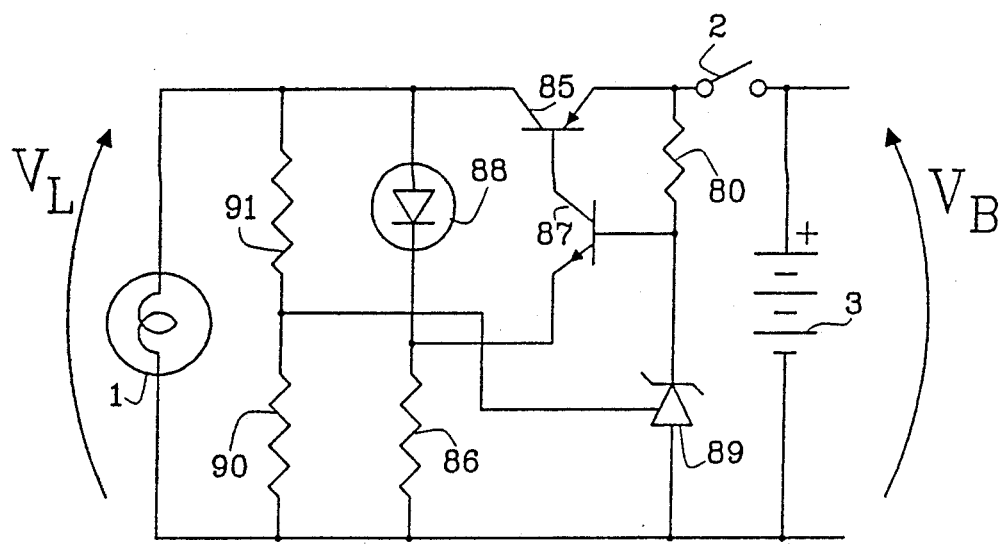
FIG. 6 is the detailed schematic of the simple lamp voltage regulator of the invention.

The simple lamp voltage regulator of block 6 in FIG. 1 is shown in detail in FIG. 6. Battery potential $V_B$ is applied to the lamp 1 through the PNP pass transistor 85 when the headlamp switch 2 is closed. Base current for the pass transistor 85 comes from the negative battery potential through limiting resistor 86 and NPN driver transistor 87. An LED 88 is connected from the output of the voltage regulator, which is the collector of the pass transistor 85, to the emitter of the driver transistor 87 thereby creating negative voltage feedback. The LED 88 is a low current type utilized for its non-linear V-I characteristics which are more suitable than that of low voltage zeners which could be substituted. The LED 88 will be lighted whenever the regulator is in a linear operation with the battery voltage $V_B$ sufficiently greater than the regulated lamp potential $V_L$ and will extinguish when the driver transistor 87 allows the maximum base current to flow to pass transistor 85 causing it to saturate. The base of driver transistor 87 which is directly related to the output voltage $V_L$ by the difference of the voltage drop of LED 88 as compared to the base-emitter drop of transistor 87 is precisely controlled by shunt regulating device 89. Resistors 90, 91 form a voltage divider on the output voltage $V_L$ to apply a potential 92 to the adjusting terminal of the shunt regulating device 89. A pull-up resistor 93 provides current to the driver transistor 87 base and to the anode of the shunt device 89 for it's proper operation. The shunt regulating device 89 then maintains the lamp voltage $V_L$ so far as the available battery potential $V_B$ and the saturation limit of pass transistor 85 will permit. The integrated shunt regulating device 89 contains frequency stabilizing components sufficient for its own operation and because the current amplification of discrete transistors 85, 87 is stabilized by a separate voltage feedback path created by LED 88 no additional frequency compensation is needed.

The integrated circuit shunt regulator 89 can be a type TL431C which is quite inexpensive and is factory trimmed to a tolerance of two percent. If one percent resistors are used for the divider 90, 91 then the overall accuracy as assembled will be four percent which adequately meets the requirements for the use of the halogen bulb 1. Continuing the example of 5 nickel-cadmium cells for battery 3 and a 6 volt 2.4 watt bulb 1 then the other parts used could be a TIP 32 for pass transistor 85, a PN2222 for driver transistor 87, 150 ohms for driver source resistor 86, 1.0K ohms for pull-up resistor 93, 14.3K ohms 1% for divider resistor 91 and 10.0K ohms 1% for divider resistor 92.

Figure 7:
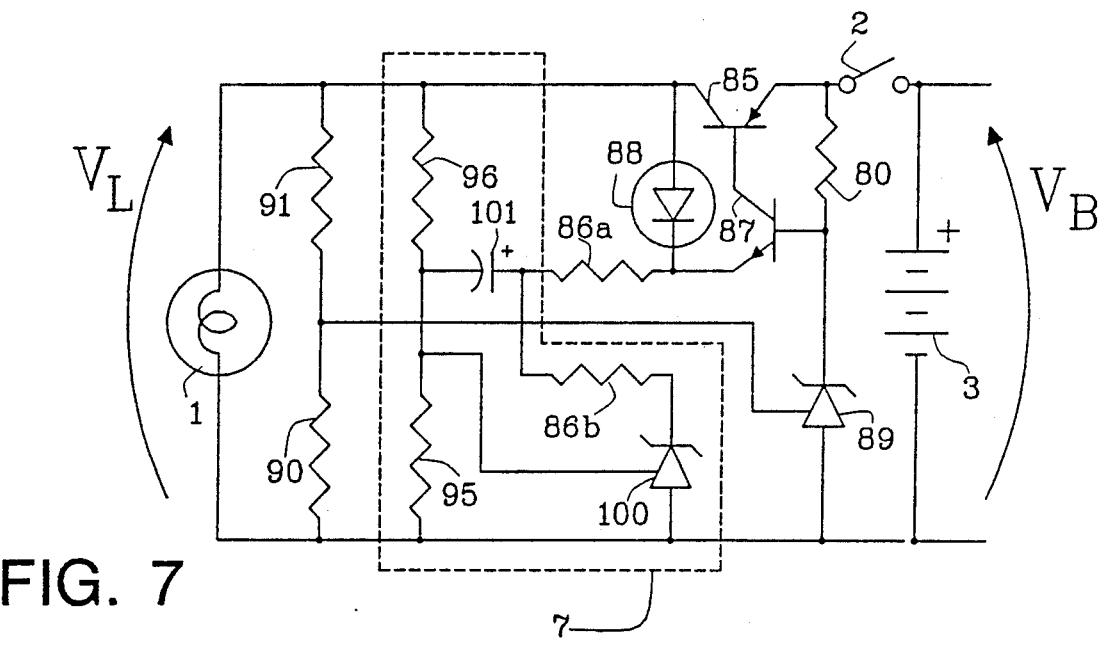
FIG. 7 is the detailed schematic diagram of the lamp voltage regulator circuit of FIG. 6 to which has been added a low battery voltage automatic shutoff feature.

In FIG. 7 the automatic cutoff circuit of block 7 in FIG. 1 has been added to lamp voltage regulator circuit block 6 of FIG. 6. With nickelcadmium and possibly other types where a number of cells have been placed in series, it is desirable to terminate the discharge when the total battery potential drops to a value which is indicative of one of the individual cells becoming completely discharged. Because the pass transistor 85 is in saturation when the battery voltage $V_B$ nears the cutoff value, the lamp voltage $V_L$ can be monitored instead by divider resistors 95, 96 whose output 99 is applied to the adjusting terminal of a shunt voltage switch 100 which then allows drive current to flow to the pass transistor 85 through limiting resistors 86a, 86b only as long as the battery voltage is higher than the cutoff value. Once the circuit 7 passes the cutoff point there will be anode voltage present on the shunt regulators 89, 100 but because no voltage is applied to their adjusting terminals only very small leakage currents will flow.

The large value capacitor 101, which becomes charged only after the circuit 7 has passed into cutoff, is added to delay the cutoff so that the lamp voltage $V_L$ can be established when the head lamp switch 2 is first turned on. Optionally a large valued resistor (not shown) for aiding in the resetting of the circuit can be added in parallel with the LED 88 to discharge the capacitor 101 which otherwise is discharged very slow by the leakage currents of the semiconductor devices. The resistor 86 of FIG. 6 which limits the pass transistor 85 base drive current is now split into two resistors 86a, 86b to provide a tap point so that there is no reverse voltage impressed on capacitor 101 enabling an electrolytic to be be used.

Continuing the example, the shunt voltage switch 100 is the same type TL431C integrated circuit shunt voltage regulator that was used previously as a voltage regulating element, the driver source resistor 86a is 56 ohms, the source resistor 86b is 27 ohms, the voltage divider resistors 90, 91 can both be 33K ohms 5%, the capacitor 101 can be a 47 μF aluminum electrolytic and the optional bleeder resistor can be 470K ohms.

The circuit of FIG. 8 represents one of the possible ways in which the battery overcharge protection block 8 of FIG. 1 can be accomplished. Sealed nickel-cadmium cells have the property of being able to accept a continuous current in overcharge if that current is limited to a safe amount related to their capacity, this usually being 10% of the current rating for a one hour discharge. The circuit of FIG. 8 operates to monitor the current which enters and leaves the battery which has been divided into two parts 3a, 3b by way of the low valued shunt resistor 105. The voltage across this shunt resistor which is proportional to battery current flow is then time averaged by resistor 106 and capacitor 107 with an added offset introduced by resistor 108 equivalent to the C÷10 current, which the battery is able to tolerate in continuous overcharge, and then applied to the differential inputs of the operational transconductance amplifier 109. The output of the amplifier 109 which is a current source with what appears electrically to be a very high impedance is applied to the gate terminal of MOSFET 110 which is shunted by capacitor 111. The phasing of the differential inputs of the transconductance amplifier 109 is such that if there is no net average charge current flowing into the battery, the potential of the MOSFET 110 gate will be nearly that of the positive terminal of battery 3a making its channel resistance low and allowing unlimited current flow into or out of the terminal 23 which connects to the battery 3bnegative. For charging conditions that would be otherwise excessive, the amplifier 109 acts to lower the gate potential of MOSFET 110 to regulate the average current which charges the battery 3a, 3b to that value which can be continuously tolerated.

The capacitor 111 acts to smooth the gate-source potential of MOSFET 110 so pulsations in the external voltage $V_x$ do not rapidly affect its conductance. The substrate connection to the integrated circuit amplifier 109 must be returned to the most negative point of the circuit which is terminal 23 during charging conditions due to the externally applied potential $V_x$. Although both capacitors 107, 111 are effective in filtering the current signal from the battery shunt 105 which contains a sizeable ripple due to the charging sources 14, 16 being alternating voltages of relatively low frequency, stability of the feedback loop does not pose a problem. Because there is no significant amount of current required to drive the insulating gate of the MOSFET 110 the resistor 113 which fixes the quiescent current consumption of the transconductance amplifier 109 is made quite large so that there is no difficulty encountered in powering the circuit of FIG. 8 continuously from the rechargeable batteries 3a, 3b.

The MOSFET device 110 contains a substrate diode inherent in its manufacturing process that functions in a practical way as the ideal diode 21 which is shown in FIG. 1. Thus the maximum voltage difference under discharging conditions between the battery voltage $V_s$ and the external voltage $V_x$ would be limited to voltage drop of this semiconductor substrate diode were it not for the fact that under discharging conditions the MOSFET 110 channel resistance will likely make this voltage much less considering that the MOSFET 110 is required to pass the current which lights the head lamp 1 which is sourced by the generator 14 and that this is much larger than the battery current which flows to light the rear warning lights 13.

Using A size cells rated at 500 milliampere-hours in the continuing example, the operational transconductance amplifier 109 is an integrated circuit type CA 3080E, the shunt resistor 105 is 0.33 ohms, the filter resistor 106 is 68K ohms, the filter capacitor 107 is 0.22 μF, the offsetting resistor 108 is 9.1 megohms, the MOSFET 110 is a type IRF 523, the gate filter capacitor 111 is 0.01 μF, and the bias setting resistor 113 is 1.5 megohms.

Figure 9:
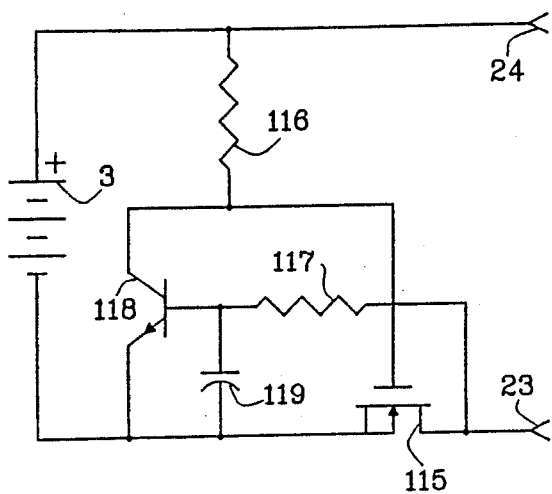
FIG. 9 is a detailed schematic diagram of an electronic fuse circuit which may be used to prevent damage in the case of abuse or inadvertent shorts in the external wiring.

FIG. 9 details a resettable electronic fuse circuit which can be utilized for the protection block 9 of FIG. 1. Current is normally allowed to flow freely in the channel of MOSFET 115 because its gate is biased by the battery voltage $V_s$ through the pull-up resistor 116. If however if the battery discharge current becomes great enough to create a voltage drop in the channel resistance of MOSFET 115 which causes base current to flow through resistor 117 into the base of transistor 118, the transistor will conduct thereby removing the gate drive to the MOSFET 115 causing it to shutoff. As long as there is a discharging load connected externally between terminals 23-24 the circuit will remain in a shutoff state but if this is unplugged then the circuit will return to a conducting state. Externally applied voltage $V_x$ which sources current in the opposite direction to charge the batteries will reverse the voltage drop across the channel of MOSFET 115 and can also allow the circuit to return to the normally conducting state.

The capacitor 119 is added to slow down the response to allow loads which in normal operation may have a short term high current requirement such as the initial connection of a capacitance or an incandescent bulb while preventing high magnitude currents which flow for a time sufficient to burn the insulation on the wiring or are otherwise harmful. The MOSFET device 115 contains a substrate diode inherent in its manufacturing process that functions in a practical way as the ideal diode 22 which is shown in FIG. 1 to carry the current from the generator 14 to the battery in a charging direction. Whether the substrate diode actually carrys charging currents depends on whether the fuse circuit has been shutoff and on the channel resistance of MOSFET 115.

Continuing the example; the MOSFET 115 may be a type IRF 153 which has a channel resistance of about 0.4 ohm giving a shutoff current in the range of 0.5-1 ampere, the pull-up resistor 116 could be 15K ohms, the base resistor 117 could be 47K ohms, the NPN transistor 118 a type 2N5089 and the delay capacitor an 0.1 μF ceramic.

In FIG. 1 the bridge rectifier 37 and the voltage limiting element 38 are shown as separate elements in the rectification portion 10 connected to the generator winding 36. However because semiconductor zener diodes may be also be used as rectifiers in the forward direction, it is possible to use an alternate arrangement shown in FIG. 10. In this arrangement the anodes of the zener diodes are grounded to the frame to facilitate the heat sinking that is required on these components which must accept nearly the full output of the generator 14 when the headlamp unit 17 is not connected.

DETAILED ELECTRICAL OPERATION OF THE REAR WARNING LIGHTS

Figure 11:
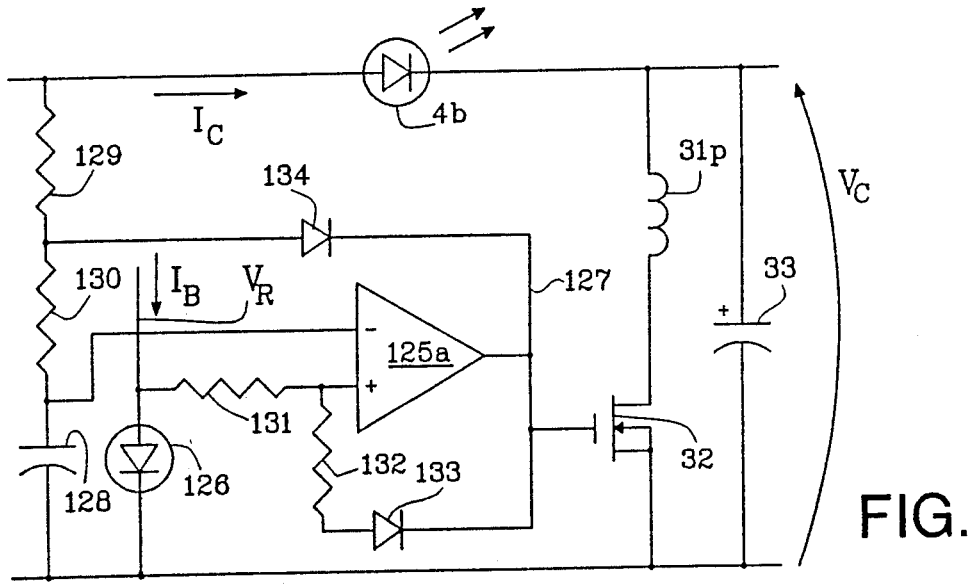
FIG. 11 is a simplified electrical schematic diagram revealing the features of the flashtube trigger circuit 11 of the invention.

FIG. 11 shows the workings of the oscillator block 11 of FIG. 1. The comparator 125a is a high gain amplifying device whose output terminal is high or low depending on which of the two signals respectively applied to its positive and negative inputs is the largest. A voltage reference $V_R$ is developed by passing a bias current through a low current LED 126 and is applied to the positive input of the comparator 125a in full when the comparator output is high. The comparator output which is connected to the gate of the MOSFET switch 32 will more conveniently be referred to as the oscillator output 127. The negative input of the comparator 125a is connected to capacitor 128 which will be charged by current flowing through resistors 129, 130 until its potential equals $V_R$ which is the potential on the positive input terminal of comparator 125a, which will cause the oscillator output 127 to reverse and become low. The voltage on the positive input of the comparator will now be reduced by the voltage divider action of resistors 131, 132 which have been connected to the lower supply potential by diode 133. The timing capacitor 128 will now begin discharging through resistor 130 whose applied potential has been removed by the conductance of diode 134 until the comparator inputs are again equal which changes the oscillator output 127 back to a high state and causes the cycle to repeat.

During the discharge time period of timing capacitor 128 the positive comparator input and the discharging current through resistor 130 will be unaffected by supply voltage changes in the circuit because the reference voltage VR remains constant and because of the relatively equal clamping action of diodes 133, 134. Thus the corresponding MOSFET switch 32 OFF time will be constant. During the charge time period of the timing capacitor 128 the voltage impressed upon the series combination of timing resistors 129, 130 will be approximately equal to the charging circuit input voltage $V_c$. This is because the voltage drop across the light source LED 4b is similar to the reference voltage $V_R$ even though different devices are used and each are subjected to different currents and because the voltage change on the timing capacitor 128 caused by the oscillations is not large, roughly one third of the amount of the reference voltage $V_R$ assuming divider resistors 131, 132 are equal. Thus the corresponding MOSFET switch 32 ON time will be an approximate inverse relationship with charging circuit input voltage $V_C$ and the duty cycle will decrease as the ON time shortens. The average charging circuit input current $I_C$ depends upon the ON time of the switch 32 and its duty cycle, thus the inverse relationship of the oscillator ON time just described is effective in maintaining the average current $I_C$ constant.

Typical parts which may be used which give the duty cycle and frequency performance factors given previously are: type number 1N4148 for the clamping diodes 133-134, 10K ohms for the two resistors 131-132, 22K ohms for OFF timing resistor 130, 91K ohms for ON timing resistor 129 and 1000 pF for the timing capacitor 128.

Figure 12:
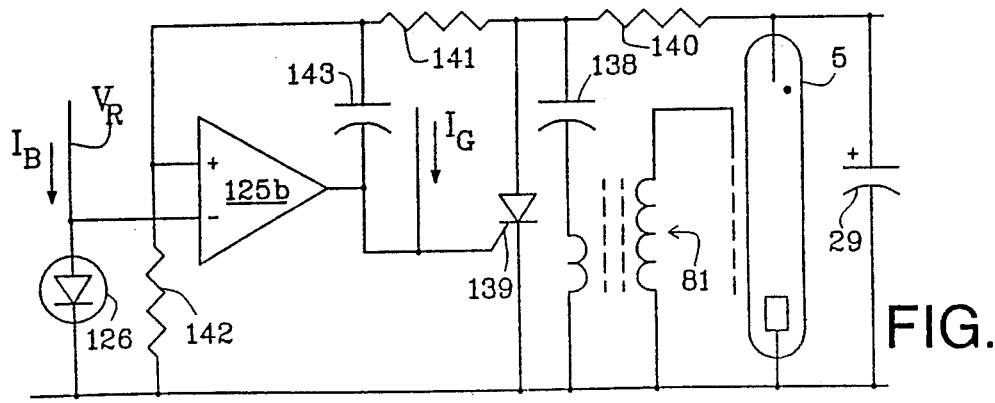
FIG. 12 Shows an alternative arrangement which uses semiconductor zener devices to combine the functions of the voltage limiting device 38 and the rectifier bridge 37 that are shown separately in FIG. 1.

The workings of the flashtube trigger circuit 12 of FIG. 1 are detailed in FIG. 12. The potential on high voltage storage capacitor 29 increases with time due to charging circuit 30 (not shown in FIG. 12) until the trigger capacitor 138 is discharged by SCR 139 into the primary of trigger coil 81 which subsequently fires the gas filled flash tube 5. The trigger capacitor 138 is charged from the upper tap of a voltage divider composed of resistors 140-142 which is supplied with the potential on storage capacitor 29. The potential on the lower tap of the voltage divider is compared with a reference voltage $V_R$ by the comparator 125b and if they are equal the comparator allows the current $I_G$ to flow into the gate of the SCR causing it to trigger.

The total resistance of the divider 140-142 can be made large to provide minimum power loss from capacitor 29 only if the leakage current through the SCR 139 which affects the voltage divider can be minimized and if false triggering from noise generated in the resistors and from stray capacity coupling to other points in the circuit, can be suppressed. The regenerative leakage current through SCR 139 is minimized by the comparator 125b output which typically holds the gate-cathode voltage of SCR 32 to less than 0.1 volts, and the noise current at the lower divider tap 141-142 is shunted to ground by the feedback capacitor 143 to eliminate false triggering. As the circuit nears the trigger point, the gate-cathode voltage of SCR 139 will increase, however before this voltage can increase to the range of 0.3 or more volts which causes an increase in the regenerative leakage currents, the capacitor 143 introduces positive feedback into the lower tap point of the voltage divider 141-142 forcing the unconditional triggering of SCR 139.

Figure 13:
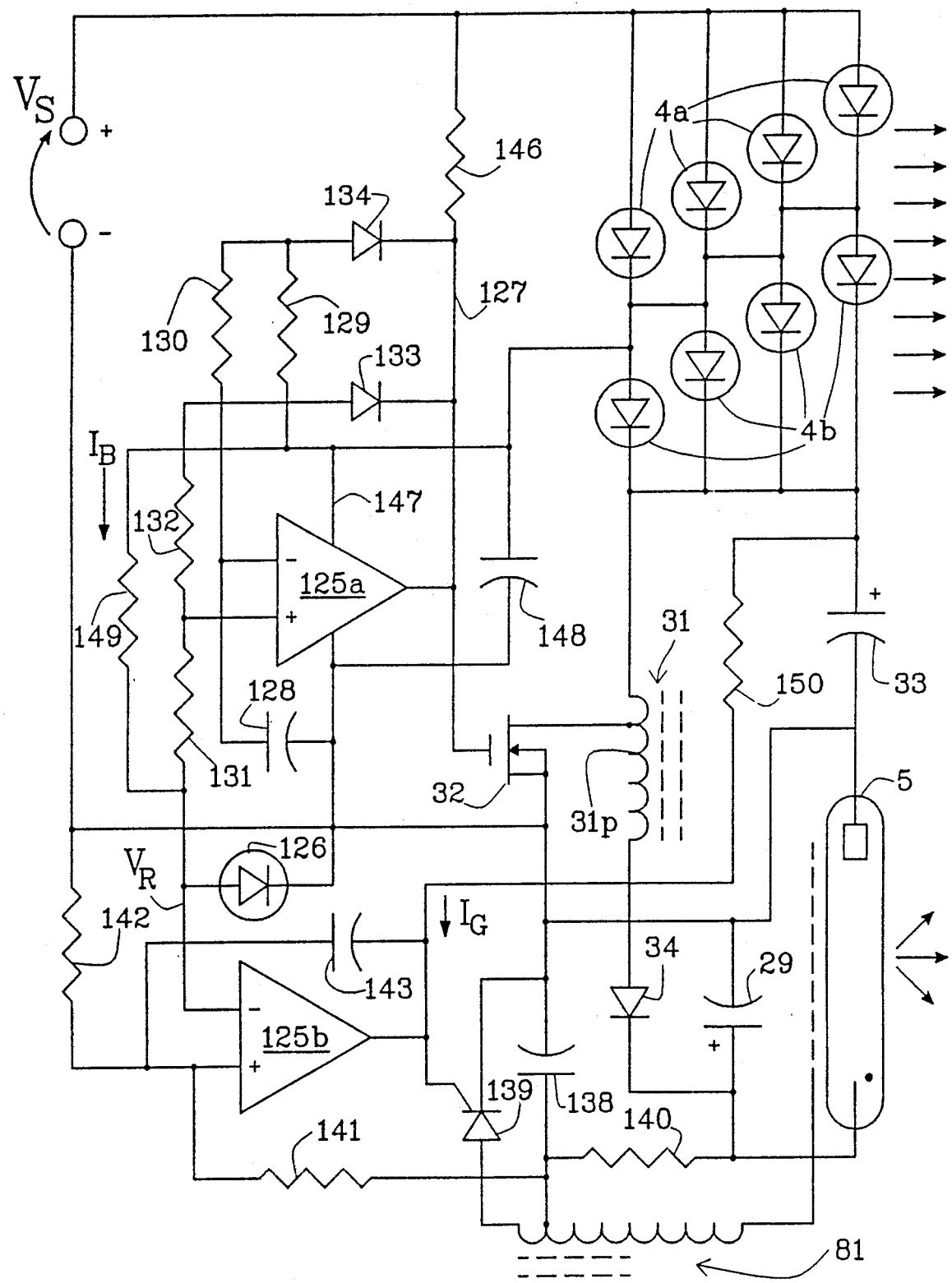
FIG. 13 is the schematic diagram of the rear warning device which is contained on the circuit board shown in perspective in FIG. 2, cut-away in FIG. 5 and in simplified form in FIGS. 5, 11-12.

The arrangement of trigger coil 81, trigger capacitor 138, SCR 139 and divider resistors 140, 141 is somewhat different than FIG. 13 shows, however this is known to be an unimportant change. The two determining factors are that the SCR, the trigger capacitor and the primary of the trigger coil be in a series loop and that the trigger capacitor be charged by the voltage divider tap point between resistors 140-141.

In a an example application of this circuit which provides a flash trigger pulse when the potential of storage capacitor 29 reaches 320 volts, it is convenient to use a type 2N5064 which is packaged in the small TO-92 plastic package for the SCR 139, a film and foil type 0.022 $\mu$F trigger capacitor 138 and trigger coil 81 which are rated and operated at only 200 volts through the dividing action of resistor 140 of 3.0 megohms and resistor 141 of 5.1 megohms. The feedback capacitor 143 can be a ceramic type in the range of 1-10 nF and the lower dividing resistor will be approximately 50k ohms.

The complete schematic for the rear warning lights 13 is shown in FIG. 13. An LED part number ESBR5603 manufactured by Stanley Electric Co. of Japan, which emits a deep red, 660 nm wavelength, beam with a total dispersion angle of about 22° can be used for the LEDs 4a, 4b which are shown in a series-parallel combination in FIG. 13. These devices have a current rating of 50 milliamperes so that a minimum of two parallel units would be required for the 100 milliamperes current $I_C$ of the example given previously. Four paralleled devices as shown here includes derating the devices to allow for possibly uneven current distribution and because it may be desireable to allot slightly more power to the rear warning lights than was done in the prior art. The voltage drop of the Stanley devices is about 1.75 volts hence the voltage $V_C$ at the input to the charging circuit which appears across capacitor 33 is about 1.5 volts when, from the continuing example, a nearly exhausted nickel-cadmium battery supplies 5 volts at terminals 27-28 but is 6 volts when the generator as limited by the zener 38 is supplying the maximum of 9.5 volts.

The capacitor 33 at the input of the charging circuit must handle a high ripple current at the conversion frequency and have low impedance to minimize power lost. These requirements are best met with a tantalum electrolytic instead of the cheaper aluminum. Tantalums also provide the benefit of smaller size and longer service life. At a conversion frequency in the range of 18-35 KHz as detailed in the example of the oscillator 11, a 6 volts —47 μF unit is adequate and not overly expensive. The inductor 31 consists of 240 turns total with 30 turns for the primary and is assembled on a 12 mm ferrite EE shaped core that has a small air gap. The MOSFET switch 32 is preferably a "logic level drive" type so that the $V_S$ supply minimum of 5 volts can saturate it. A type number 2SK739 which has a breakdown rating of 60 volts and an ON resistance of about 0.25 ohm is quite satisfactory here.

The energy delivered per flash by the storage capacitor 29 to the flash tube 8 is proportional to the difference in the squares of the initial voltage and the remaining voltage, a characteristic of the flash tube, here about 60 volts. It is a fact that the size of an aluminum electrolytic capacitor decreases with an increase in voltage rating given the condition of equal energy storage. The preferred embodiment thus uses a higher voltage, 10 μF at 350 VW unit which nonetheless results in capacitor 25 still being the largest component inside the somewhat limited space formed by plastic enclosure pieces 60, 61. This necessitates the use of a flash tube with a higher rating and results in less efficiency in the charging circuit 30 due to the higher voltage step-up required although the measured performance of better than 70% is thought to be adequate.

The high voltage diode 34 must be a fast recovery type such as the 1N4936 or alternatively it can consist of three lower voltage 1N914 computer diodes in series. The latter combination gives better efficiency because the computer diodes turn-off faster and have lower capacity which results in less power being lost in the coil ringing, but there is some risk in the combination of unmatched parts which are not normally used in this type of application.

An integrated circuit dual comparator of type number LM 393 is used for the comparators 125a, 125b because it is inexpensive and because it has several features which are particularly desireable. This device has an open collector output which can be taken more positive than its power supply terminal and it can be powered with as little as 3 volts. This enables the full supply voltage $V_S$ to be applied to the gate terminal of MOSFET 32 through pull-up resistor 146 with a typical value of 10K ohms while the dual comparator's power supply terminal 147 is protected from the application of reverse voltages by the LEDs 4a. The supply terminals of the integrated circuit comparator 125 are bypassed by capacitor 148 which may be a 0.1 μF or larger ceramic. The bias current $I_S$ to the LED 126 to create the reference voltage $V_R$ is provided by resistor 149 of 1K ohms and the gate current $I_G$ for SCR 139 is supplied by resistor 150 of 4.7 ohms.

The embodiment of the invention which is thought to be the most useful has been presented along with device types, part values, performance levels and constructional details to facilitate understanding, but this should not be considered restrictive. Although the invention has been described, in detail for use on a bicycle, the system of the invention with its uncomplicated hook-up and modest power requirements could be used on other small vehicles, especially those lacking a sizeable engine. And the high visibility, ease of attachment, light weight and low power drain of the steady-flashing-reflector warning device may be especially useful for pedestrians and joggers.

I claim:

1. A combination electric warning light and retro-reflector for small vehicle or pedestrian comprising
   a retro-reflector including a transparent body having a multiplicity of corner reflectors molded on a substantially flat face thereof lying substantially in a plane adapted to be oriented approximately vertically and having an effective area of at least one square inch,
   a directional beam emitting monochromatic light source juxtaposed with said retro-reflector in a manner which leaves said beam unobstructed by said retro-reflector, said source being oriented to cause said beam to have a direction generally normal to said plane.
   a pulsed gas discharge light source arranged to emit light through the plane of said retro-reflector with a wide angle of dispersion, and
   means located at least partially behind the outline of said retro-reflector for supplying power to said monochromatic light source and gas discharge light source.

2. Apparatus as recited in claim 1 wherein said monochromatic light source comprises a plurality of light-emitting diodes.

3. Apparatus as recited in claim 1 wherein said pulsed gas discharge light source includes a gas-filled flash tube, a capacitor, and a charging circuit therefor.

4. Apparatus as recited in claim 1 wherein said gas discharge light source is arranged to emit light through said face of said corner reflectors.

5. Apparatus as recited in claim 3 wherein said means for supplying power is connected to provide current serially through said monochromatic light source and said charging circuit.

6. Apparatus as recited in claim 1 wherein said monochromatic light source includes a plurality of light-emitting diodes lying proximate to the plane of said retro-reflector and within the outline of the effective area of said retro-reflector.

7. A regulation circuit for a combined LED and pulsed gas discharge lamp warning light comprising;
   at least on LED,
   a pulsed gas discharge light source including a charging circuit, said charging circuit being connected to receive the current flowing through said LED,
   means operable for regulating the power supplied to said LED and charging circuit from a substantially unipolar potential source of possibly great electric potential variation and of undetermined internal impedance, and
   means for maintaining a current through said charging circuit at a relatively constant average value with the result that the current and power supplied to said LED is substantially constant, said means for maintaining the current in said charging circuit at relatively constant average value includes a switch and means for sensing the voltage across said charging circuit causing the on-time of said switch and the charging circuit duty factor to increase in response to decreases in said voltage.

8. Apparatus as recited in claim 7 wherein said at least one LED comprises a plurality of LED's at least four in number arranged in a series-parallel circuit.

9. Apparatus as recited in claim 7 wherein said means for causing the on-time of said switch to increase includes a voltage reference element, a capacitor-resistor circuit charged by said voltage, and a comparator element.

10. A headlamp and warning light system for a bicycle or the like comprising;
   a generator,
   a secondary battery connected substantially parallel with said generator,
   a warning light including an LED light source having a relatively low power requirement,
   a headlamp having a relatively high power requirement,
   means for providing adequate voltage and current from said battery to said warning light when said headlamp is operative and said battery is not fully charged, and
   means for preventing excess voltage or current being supplied to said warning light from said generator other than when said battery is not fully charged and said headlamp is operative,
   said warning light, said headlamp and said battery have a common electrical path for which the conductive frame of said bicycle may be utilized.

11. Apparatus as recited in claim 10 wherein said generator has an integral rectifying circuit including voltage limiting elements tending to regulate the voltage produced by said generator.

12. Apparatus as recited in claim 10 further including an undervoltage disconnect circuit for placing said battery in a non-discharging mode rather than a discharging mode.

13. Apparatus as recited in claim 10 further including means for limiting recharging current to said battery.

14. Apparatus as recited in claim 10 further including means for preventing battery overdischarge by limiting current through one of the electrical paths that connects to the headlamp.

15. A combination electric warning light and retro-reflector for small vehicle or pedestrian comprising
   a retro-reflector lying substantially in a plane adapted to be oriented approximately vertically and having an effective area of at least one square inch,
   a directional beam emitting monochromatic light source juxtaposed with said retro-reflector in a manner which leaves said beam unobstructed by said retro-reflector,
   a pulsed gas discharge light source arranged to emit light through the plane of said retro-reflector with a wide angle of dispersion,
   a circuit board disposed generally parallel to said plane,
   parts for the operation of said monochromatic light source and said gas discharge light source being affixed to and connected by the circuit board,
   the circuit board together with said parts being proximate to said retro-reflector, and
   means for connecting an electrical potential, external of said warning light, to the circuit board to energize the light source means through the circuit established by said parts and circuit board,
   said gas discharge light source including a first electrical element consisting of a gas-filled flashtube for producing warning flashes and said monochromatic light source including a second electrical element comprising at least one LED for producing a steady light,
   said directional beam being produced steadily,
   said warning flashes being broadly dispersed to the environment,
   the second electrical element being in electrical series combination with the input of a voltage step-up converter, said combination being connected to said external potential by said connecting means, the output of the voltage converter charging a storage capacitor which is repeatedly discharged by firing the flashtube.

16. Apparatus as recited in claim 15 wherein said monochromatic light source comprises a plurality of light-emitting diodes.

17. Apparatus as recited in claim 15 wherein said retro-reflector includes a transparent plastic body having a multiplicity of corner reflectors molded on a substantially flat face thereof.

18. A combination electric warning light and retro-reflector for small vehicle or pedestrian comprising;
   a beam emitting light source,
   a gas discharge light source,
   an electrical power supply and control circuit,
   means for connecting an electrical potential, external of said warning light, to said circuit,
   said gas discharge light source comprising a first electrical element including a gas-filled flashtube for producing warning flashes and said beam-emitting light source including a second electrical element comprising at least one LED for producing a steady light,
   said second electrical element being in electrical series combination with the input of a voltage step-up converter, said combination being connected to said external potential by said means for connecting an electrical potential, the output of said voltage converter charging a storage capacitor which is repeatedly discharged by firing of said flashtube,
   said beam emitting light source comprises a plurality of light-emitting diodes.

19. In a warning light, a trigger circuit responsive to the potential applied to a pulsed gas discharge lamp arranged to emit light generally through the plane of a retro-reflective surface comprising;
   a silicon controlled rectifier having a gate,
   a trigger capacitor,
   means to charge said trigger capacitor from the potential at terminals of said gas discharge lamp,
   an integrated circuit comparator having a non-inverting input and effectively shorting the gate junction of said silicon controlled rectifier to substantially reduce the anode leakage current,
   a voltage divider connected thereto, and to receive the potential on said pulsed gas discharge lamp, and
   a positive feedback capacitor connected between said non-inverting input and said gate of the silicon controlled rectifier whereby consistent triggering is achieved,
   said means to charge said trigger capacitor includes a resistor connected between an electrode of said pulsed gas discharge lamp and said trigger capacitor.

20. The trigger circuit of claim 19 wherein said voltage divider comprises two resistors, the first of which is connected between a terminal of said trigger capacitor and said non-inverting input and the second of which is connected to pass current from said non-inverting input back to an electrode of said gas discharge lamp.

21. The trigger circuit of claim 19 further including a firing transformer wherein said silicon controlled rectifier is in a series loop connection with said trigger capacitor and the primary winding of said firing transformer, a winding of which is also connected to said gas discharge lamp so as to initiate a pulse discharge from the triggering of said silicon controlled rectifier.

22. Apparatus as recited in claim 19 further including means for preventing battery overcharge by limiting current through one of the electrical paths that connects to said battery.

* * * * *